(12) United States Patent
Stimpson et al.

(10) Patent No.: US 10,760,536 B2
(45) Date of Patent: Sep. 1, 2020

(54) AIR BOX FOR A VEHICLE

(71) Applicant: Indian Motorcycle International, LLC, Medina, MN (US)

(72) Inventors: Matthew W Stimpson, Nowthen, MN (US); Kent A Underland, Coon Rapids, MN (US); Joseph G Roltgen, Chisago City, MN (US); Blaine D Kaeser, Chisago City, MN (US)

(73) Assignee: Indian Motorcycle International, LLC, Medina, MN (US)

( * ) Notice: Subject to any disclaimer, the term of this patent is extended or adjusted under 35 U.S.C. 154(b) by 0 days.

(21) Appl. No.: 15/796,401

(22) Filed: Oct. 27, 2017

(65) Prior Publication Data

US 2019/0128220 A1 May 2, 2019

(51) Int. Cl.
*B01D 46/10* (2006.01)
*F02M 35/104* (2006.01)
(Continued)

(52) U.S. Cl.
CPC ..... *F02M 35/0201* (2013.01); *B01D 46/0005* (2013.01); *B01D 46/0041* (2013.01); *B01D 46/10* (2013.01); *F02M 35/02483* (2013.01); *F02M 35/02491* (2013.01); *F02M 35/162* (2013.01); *B01D 46/106* (2013.01); *B01D 46/521* (2013.01); *B01D 2271/02* (2013.01); *B01D 2275/203* (2013.01);
(Continued)

(58) Field of Classification Search
CPC ................ B01D 46/0041; B01D 46/10; B01D 46/0005; B01D 46/106; B01D 46/521; B01D 2275/203; B01D 2275/208; B01D 2271/02; B01D 2279/60; F02M 35/0201; F02M 35/02491; F02M 35/162; F02M 35/02483; F02M 35/10078; F02M 35/10013; F02M 35/048; F02M 35/02433; F02M 35/104
USPC ........... 55/395.3, 495, 502, 385.3; 180/68.3; 123/198 E, 184.21
See application file for complete search history.

(56) References Cited

U.S. PATENT DOCUMENTS 5,307,771 A 5/1994 Stahel, II
5,918,576 A 7/1999 Ohoka
(Continued)

FOREIGN PATENT DOCUMENTS

DE 3708756 A1 9/1988
EP 1526273 A2 4/2005
(Continued)

OTHER PUBLICATIONS

International Preliminary Report on Patentability issued by the International Bureau of WIPO, dated Apr. 28, 2020, for International Patent Application No. PCT/US2018/056255; 9 pages.
(Continued)

*Primary Examiner* — Minh Chau T Pham
(74) *Attorney, Agent, or Firm* — Austin Holt; Faegre Drinker Biddle & Reath LLP (57) ABSTRACT

A vehicle including a powertrain assembly supported by the frame and an air intake assembly operably coupled to the powertrain assembly. The air intake assembly includes at least one inlet configured to direct air to different portions of an intake housing and filter positioned therein. The filter contains multiple sealing surfaces and a central air outlet.

37 Claims, 11 Drawing Sheets

(51) Int. Cl.
*F02M 35/02* (2006.01)
*F02M 35/024* (2006.01)
*B01D 46/00* (2006.01)
*F02M 35/16* (2006.01)
*F02M 35/10* (2006.01)
*B01D 46/52* (2006.01)
*F02M 35/04* (2006.01)

(52) U.S. Cl.
CPC .... *B01D 2275/208* (2013.01); *B01D 2277/10* (2013.01); *B01D 2279/60* (2013.01); *F02M 35/02433* (2013.01); *F02M 35/048* (2013.01); *F02M 35/104* (2013.01); *F02M 35/10013* (2013.01); *F02M 35/10078* (2013.01)

(56) References Cited

U.S. PATENT DOCUMENTS

| | | | |
|---|---|---|---|
| 6,251,151 B1 | 6/2001 | Schulz | |
| 6,355,077 B1 | 3/2002 | Chittenden | |
| 6,447,567 B1 | 9/2002 | Ehrenberg | |
| 6,804,360 B1 | 10/2004 | Misawa | |
| 7,384,440 B2* | 6/2008 | Takano | F02M 35/0203 123/198 E |
| 7,753,980 B2* | 7/2010 | Kobayashi | F02M 35/0203 55/315 |
| 7,779,950 B2 | 8/2010 | Hoeve | |
| 8,105,406 B2 | 1/2012 | Nishizawa | |
| 8,419,834 B2* | 4/2013 | Rotter | B01D 46/0004 123/198 E |
| 8,535,403 B2* | 9/2013 | Patwardhan | B01D 46/125 55/385.3 |
| 8,652,238 B2* | 2/2014 | James | F02M 35/162 123/198 E |
| 8,876,931 B2* | 11/2014 | Braithwaite | B01D 46/2411 210/232 |
| 9,440,504 B2 | 9/2016 | Bagnariol | |
| 2004/0011011 A1* | 1/2004 | Storz | F02M 35/1216 55/385.3 |
| 2004/0206058 A1* | 10/2004 | Bugli | B01D 46/0005 55/385.3 |
| 2005/0241609 A1* | 11/2005 | Kobayashi | F02M 35/0203 123/198 E |
| 2005/0241610 A1* | 11/2005 | Takano | F02M 35/0203 123/198 E |
| 2006/0260284 A1* | 11/2006 | Masciotra | B01D 46/008 55/493 |
| 2008/0083200 A1* | 4/2008 | Gruber | B62J 37/00 55/385.3 |
| 2009/0090090 A1* | 4/2009 | Nishizawa | B01D 46/0005 55/290 |
| 2011/0232983 A1* | 9/2011 | Abe | B01D 46/0005 180/68.3 |
| 2018/0045145 A1* | 2/2018 | Williams | F02M 35/02433 |

FOREIGN PATENT DOCUMENTS

| | | |
|---|---|---|
| EP | 2952708 A1 | 12/2015 |
| JP | S62178767 A | 8/1987 |
| JP | S63243448 A | 10/1988 |
| WO | 2012109362 A1 | 8/2012 |
| WO | 2015070216 A2 | 5/2015 |

OTHER PUBLICATIONS

International Search Report and Written Opinion issued by the European Patent Office, dated Jan. 30, 2019, for International Patent Application No. PCT/US2018/056255; 15 pages.

* cited by examiner

AIR BOX FOR A VEHICLE

FIELD OF THE DISCLOSURE

The present invention relates to an air box for a vehicle and, more particularly, to an air box with at least a portion configured to maximize vehicle performance and reduce parts.

BACKGROUND OF THE DISCLOSURE

Vehicles, for example motorcycles, include an air intake assembly configured to receive ambient air for combustion within an internal combustion engine. Oftentimes, the air intake assembly includes an air box and, if the vehicle is a motorcycle, the air box may be positioned at a forward portion of the vehicle adjacent the fuel tank.

The air box filters and directs air into the intake of the engine and is positioned between the engine intake and atmosphere. Typically, performance can be enhanced by maximizing the size of the air box on the clean and dirty side of the filter and by maximizing the filter area. However, with motorcycles there is often limited space to do so.

SUMMARY OF THE DISCLOSURE

The present disclosure relates to two-wheeled vehicles and, more particularly, to motorcycles having an internal combustion engine with an efficient air intake system.

According to an illustrative embodiment of the present disclosure, a vehicle intake is configured for a vehicle extends along a longitudinal centerline comprises an air filter housing and includes a housing inlet and a flat panel air filter. The flat panel filter has a filter inlet and a filter outlet. The airflow path through the filter inlet is substantially parallel to an airflow path through the filter outlet.

According to another illustrative embodiment of the present disclosure, an air box is configured to be fluidly coupled to an engine of a vehicle, the air box comprises a housing and includes a housing inlet and a filter positioned within the housing. The housing inlet contains a plurality of intake passages configured to direct air to different portions of the filter.

According to yet another illustrative embodiment of the present disclosure, an air box is configured to be fluidly coupled to an engine of a vehicle, the air box comprises a housing and a filter positioned within the housing and includes a filter media. A first portion of the filter defines an outer surface of the filter and a second portion defines an inner portion of the filter. The filter media is positioned intermediate the first and second portions, and the second portion is positioned radially inward of the first portion. The second portion further includes an opening defines an outlet of the filter housing and the filter media is radially inward of the first portion.

According to a further illustrative embodiment of the present disclosure, an air box is configured to be fluidly coupled to an engine of a vehicle. The air box comprises a flat-panel filter includes a frame and a filter media positioned within the frame. The frame includes an opening positioned radially inward of the frame and configured to provide filtered air to a throttle body of the engine.

BRIEF DESCRIPTION OF THE DRAWINGS

The above mentioned and other features of this invention, and the manner of attaining them, will become more apparent and the invention itself will be better understood by reference to the following description of embodiments of the invention taken in conjunction with the accompanying drawings, where.

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to a motorcycle, it should be understood that the features disclosed herein may have application to other types of vehicles such as other all-terrain vehicles, utility vehicles, two- and three-wheeled vehicles, snowmobiles, and golf carts.

Figure 1:
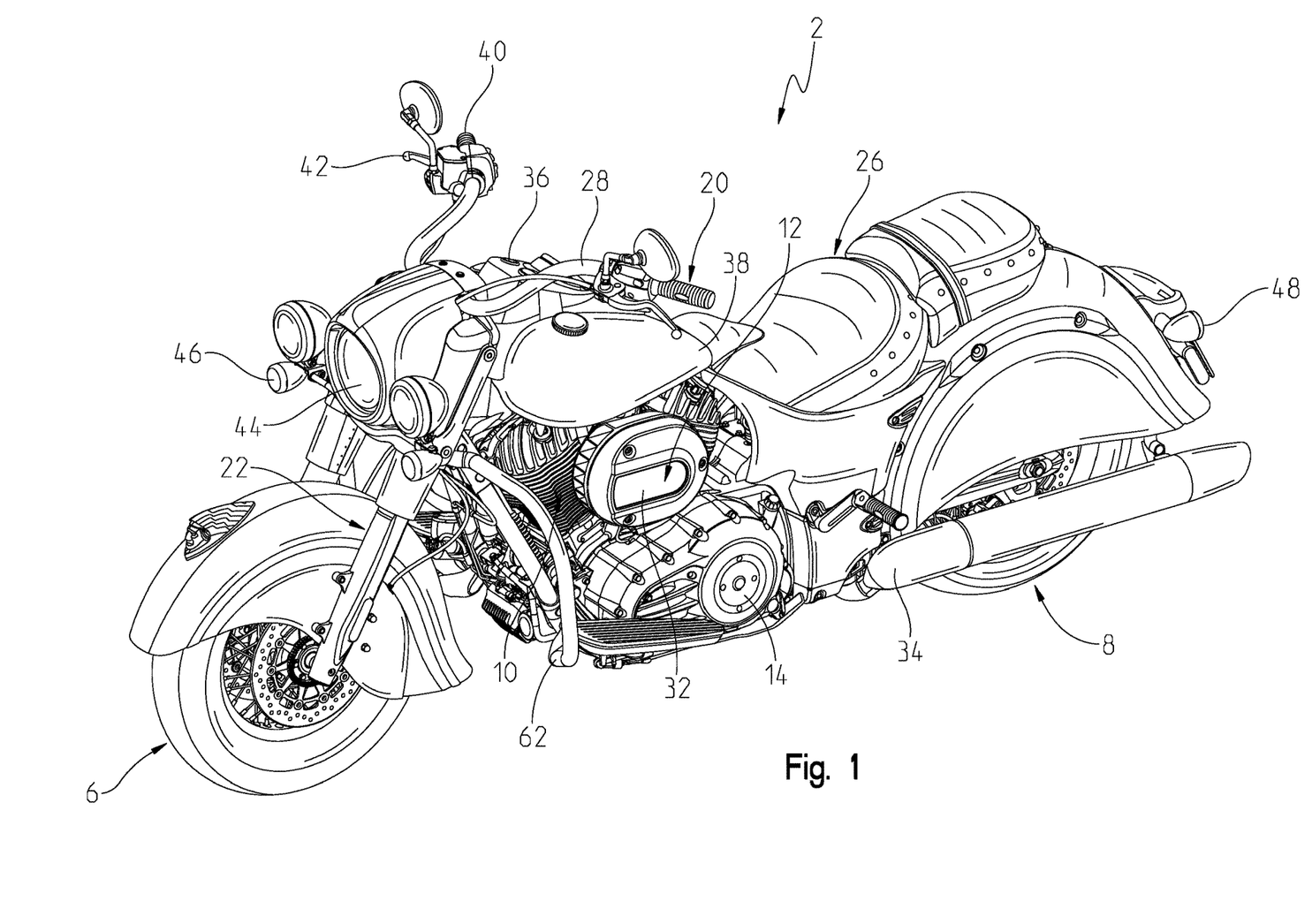
FIG. 1 is a front left perspective view of a vehicle including an air box of the present disclosure.

Referring to FIG. 1, an illustrative embodiment of a vehicle 2 is shown. Vehicle 2 may be configured for on-road and off-road conditions and, illustratively, is shown as a motorcycle. Vehicle 2 includes a plurality of ground-engaging members, illustratively a single front wheel 6 and a single rear wheel 8. In one embodiment, one or more of the ground-engaging members 6, 8 may be replaced with tracks, such as the Prospector II Tracks available from Polaris Industries Inc., located at 2100 Highway 55 in Medina, Minn. 55340, or non-pneumatic tires, such as those shown in U.S. Pat. Nos. 8,176,957 and 8,104,524, the complete disclosures of which are expressly incorporated herein by reference. Illustratively, vehicle 2 is a two-wheeled vehicle and additional details of vehicle 2 may be disclosed in U.S. Pat. No. 9,421,860, filed on Nov. 12, 2013, the complete disclosure of which is expressly incorporated by reference herein.

Figure 2:
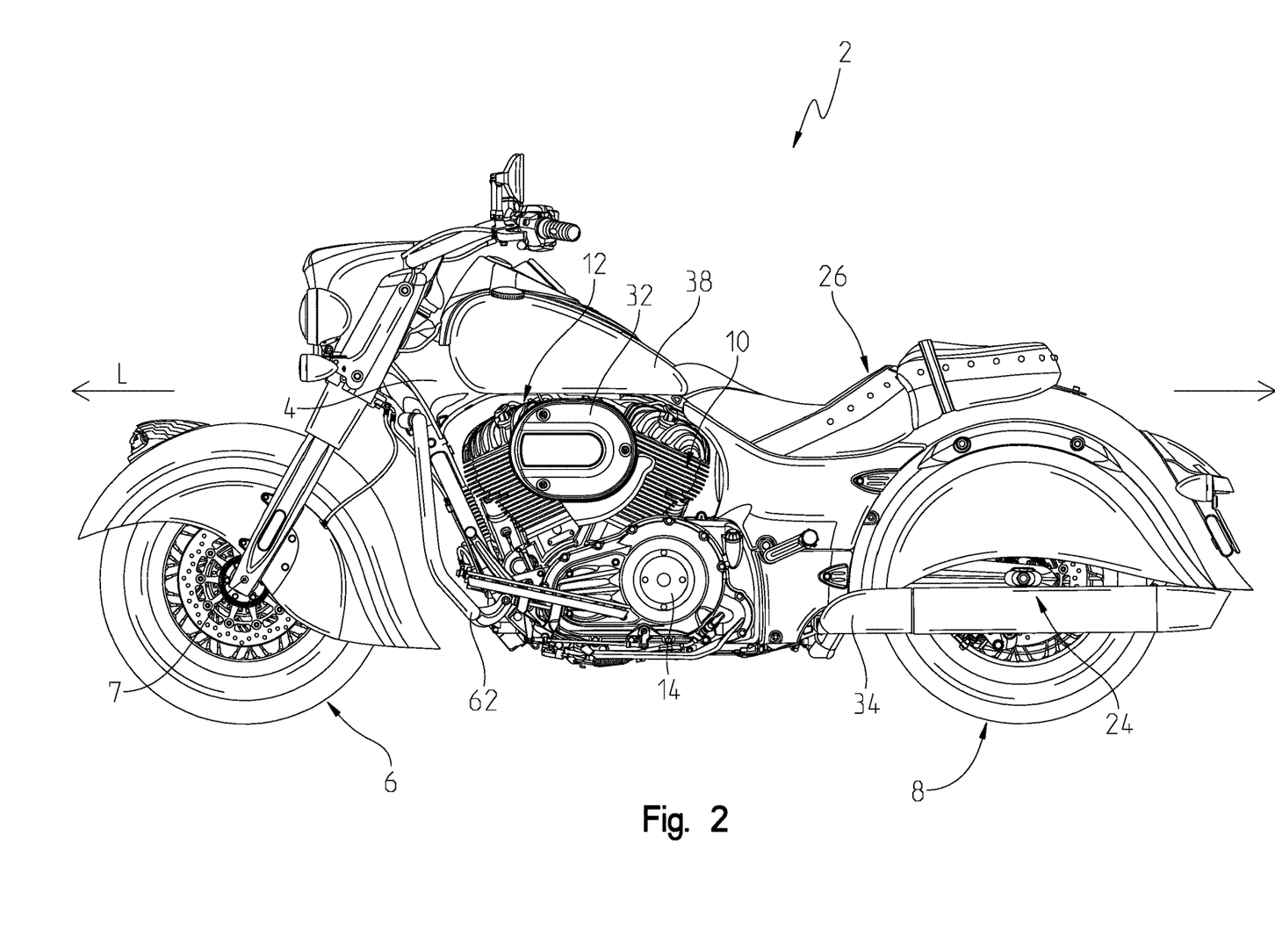
FIG. 2 is a left side perspective view of the vehicle of FIG. 1.

Vehicle 2 includes a frame 4 (FIG. 2) supported by ground engaging members 6, 8. Frame 4 extends along a longitudinal centerline L of vehicle 2, as shown in FIG. 2. Vehicle 2 travels relative to the ground on front wheel 6 and rear wheel 8.

Referring still to FIGS. 1 and 2, rear wheel 8 is coupled to a power train assembly 10 to propel vehicle 2 through rear wheel. Power train assembly 10 includes both an engine 12 and transmission 14. Transmission 14 is operably coupled to engine 12 which provides power to rear wheel 8. In the illustrated embodiment, engine 12 is a 49° V-twin spark-ignition gasoline engine available from Polaris Industries, Inc. located at 2100 Highway 55 in Medina, Minn. 55340. In alternative embodiments, rear wheel 8 is coupled to a drive shaft through a chain drive or other suitable couplings. The drive arrangement in the illustrated embodiment is comprised of a six speed overdrive constant mesh transmission with a carbon fiber reinforced belt available from Polaris Industries, Inc. In alternative embodiments, transmission 14 is a continuously variable transmission (CVT).

As shown in FIGS. 1 and 2, it will be appreciated that while vehicle 2 is illustrated as a two-wheel vehicle, various embodiments of the present teachings are also operable with three, four, or six wheeled vehicles, or any number of wheels configured for vehicle 2. It will also be appreciated that while a spark-ignition gasoline engine is illustrated, electric motors, and other suitable torque-generating machines are operable with various embodiments of the present teachings.

Motorcycle 2 also generally includes a steering assembly 20, front suspension 22, rear suspension 24 (FIG. 2), and seat 26. Steering assembly 20 includes handlebars 28 which may be moved by an operator to rotate front wheel 6 either to the left or the right. Engine operating systems are also included such as an air intake system 32 and exhaust system 34 (FIG. 2). Operator controls are also provided for operating and controlling vehicle 2, which may include vehicle starting system 36, vehicle speed controls 40 and vehicle braking systems 42. Electrical systems may also be provided such as main lighting 44, front turn signals 46, and rear turn signals 48. Vehicle protection equipment may include highway bars 62.

Figure 3:
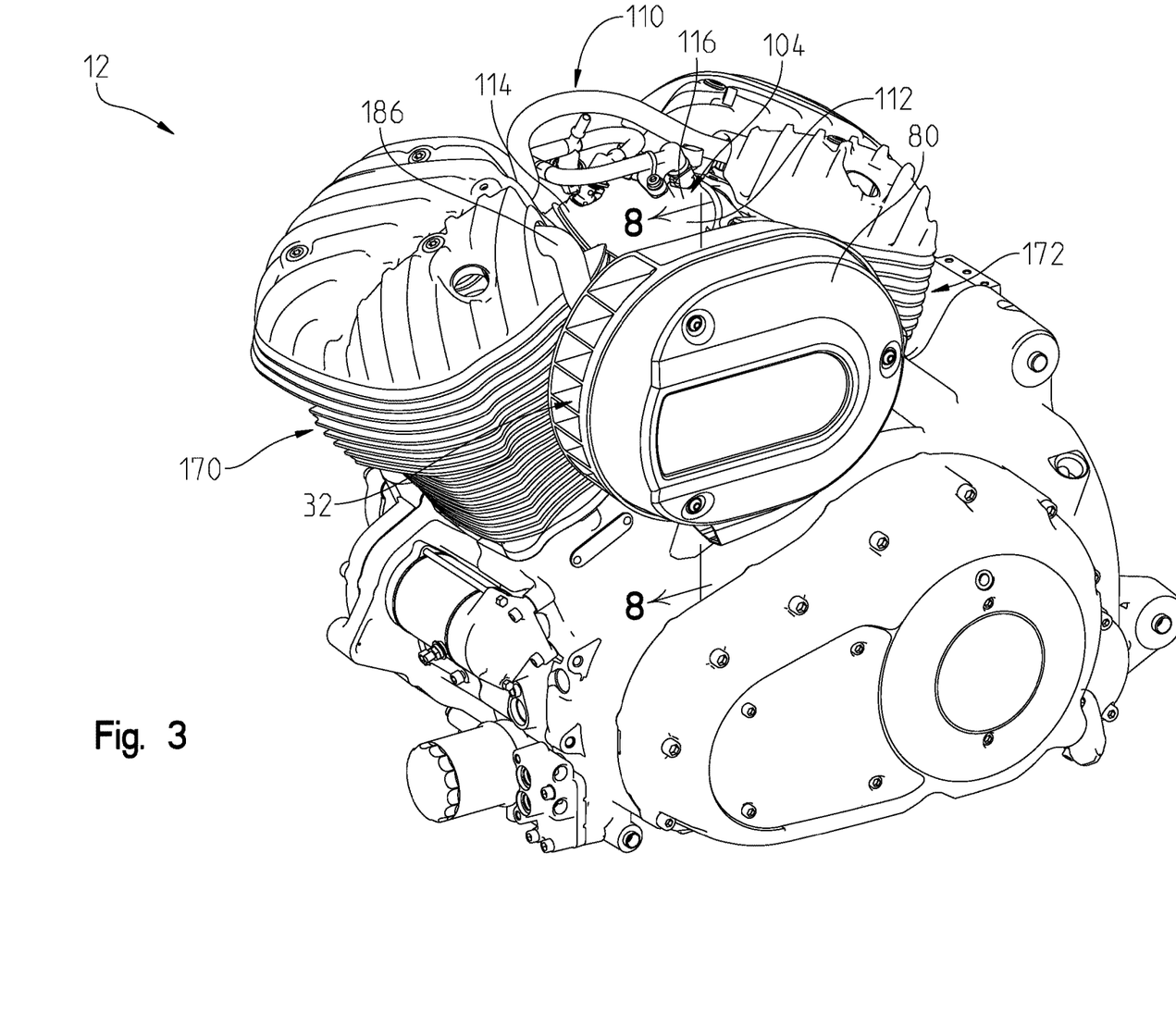
FIG. 3 is a front left perspective view of an engine coupled to the air box of FIG. 1.

Referring to FIGS. 2 and 3, air intake system 32 extends laterally outward from engine 12 on the left side of the motorcycle looking forward and is positioned longitudinally intermediate cylinders 170, 172 of engine 12. Air intake system 32 is positioned vertically lower than a fuel tank 38 (FIG. 2) of vehicle 2 and vertically higher than a wheel axis of rotation 7, as shown best in FIG. 2. Further, air intake system 32 is positioned longitudinally rearward of a forwardmost portion of fuel tank 38 and forward of a forwardmost portion of seat 26, as also shown in FIG. 2. In alternative embodiments, the air box is located on the right side of the motorcycle.

Figure 4:
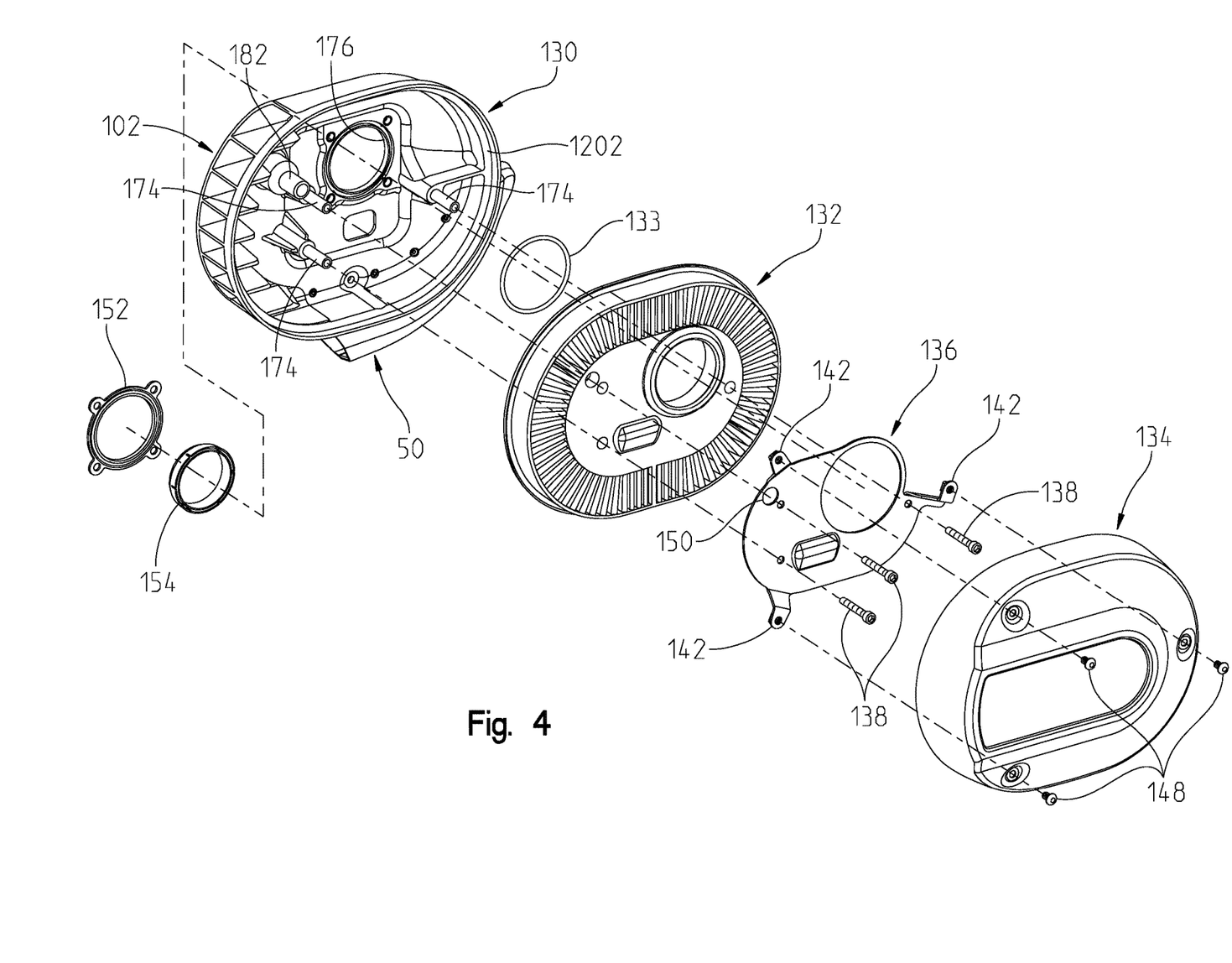
FIG. 4 is perspective front exploded view of the air box of FIG. 1.
Figure 5:
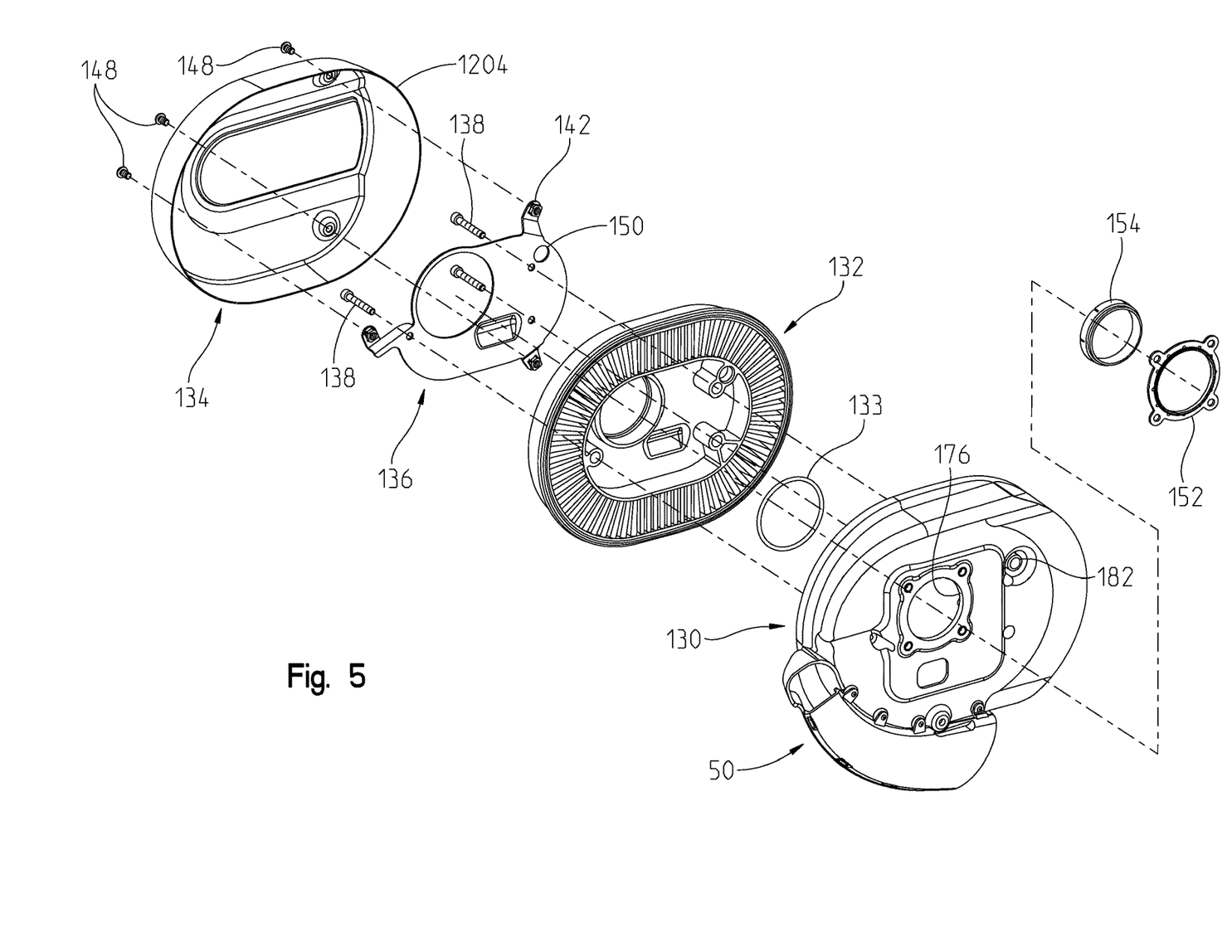
FIG. 5 is a rear exploded view of the air box of FIG. 4.
Figure 6:
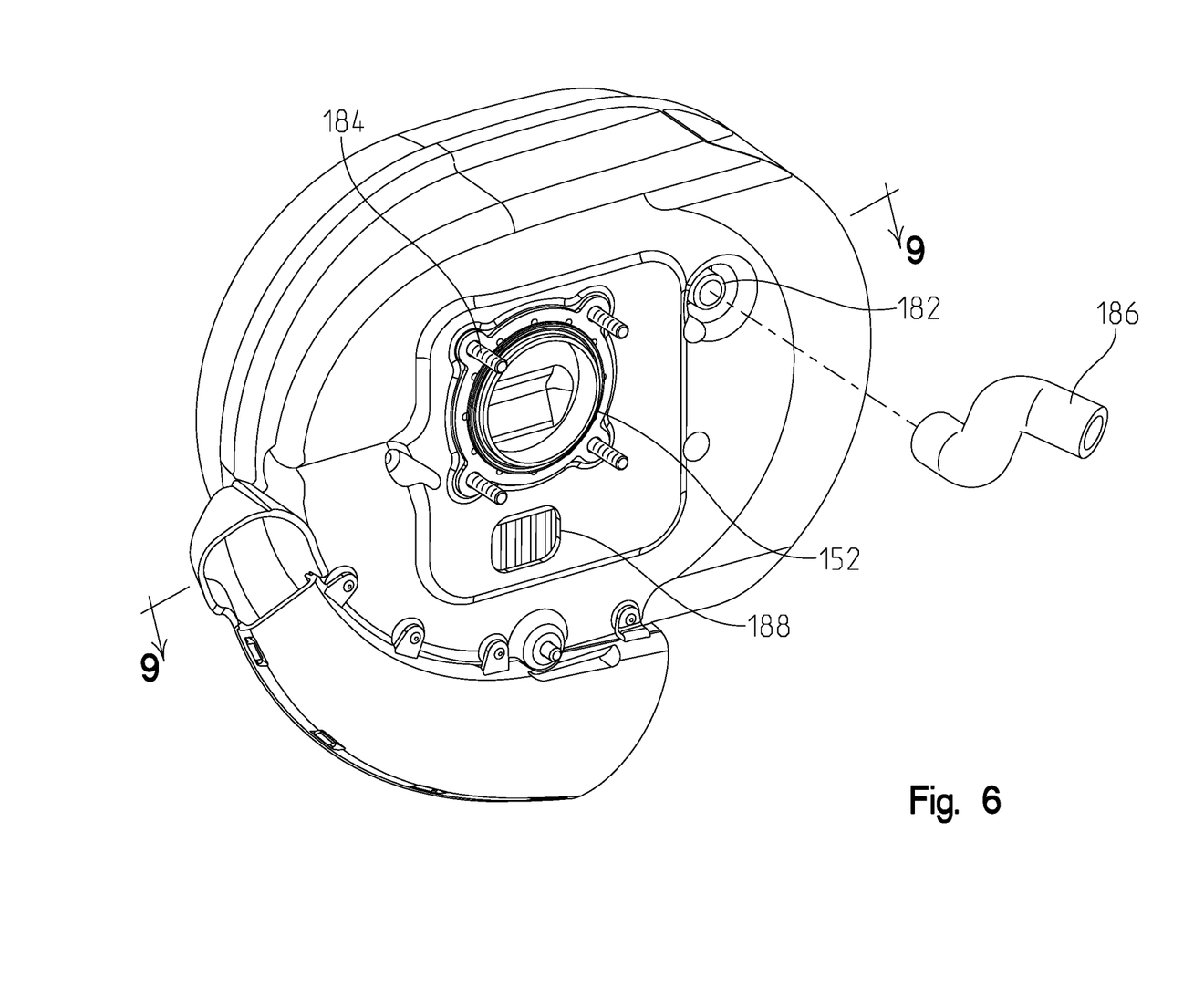
FIG. 6 is a rear right perspective view of the air box of FIG. 1 with a breather tube.

As shown in FIGS. 3-6, air intake system 32 comprises an air cleaner 80 having at least one intake duct at 102. Illustratively, air cleaner 80 includes a plurality of intake ducts 102, each of which may intersect a portion of fuel tank 38 (FIG. 2) in the longitudinal direction of vehicle 2. With reference now to FIG. 3, engine air intake system 32 is shown including a crankcase ventilation system 110 of air intake system 32. Additionally, a throttle 104 is positioned intermediate cylinders 170, 172 and includes an intake port 112 from air cleaner 80 and first 114 and second 116 exit ports configured to provide air through intake ports of cylinder 170, 172, respectively. As shown in FIGS. 4 and 5, air cleaner 80 includes a housing portion 130, O-ring seal 133, air valve 131 (FIG. 8), filter 132, and cover 134. The interior of air cleaner 80 generally provides an air flow path from atmosphere through intake ducts 102 defined in housing portion 130 to an output aperture 176 (FIG. 4) defined in housing portion 130 via at least filter 132 and air valve 131. In this way, intake ducts 102 generally define a housing inlet of housing portion 130. A ventilation system 110 (FIG. 3) is shown which provides ventilation of crankcase gases back to air cleaner 80 through port 182 and a breather tube or conduit 186 (FIGS. 3 and 6). Housing portion 130 further includes cover mounts 174 that provide stand-off portions that allow for secure mounting of a cover plate 136 to housing portion 130 using fasteners 138. Cover plate 136 attaches cover 134 to cover mounts 174 on housing 130 and further includes offsets 142 for securing cover 134 to cover plate 136 using fasteners 148.

Air cleaner 80 further includes a housing seal 152 and an air valve insert 154 which sealingly couple air valve 131 to housing 130. Housing seal 152 is positioned intermediate housing 130 and intake port 112 of throttle body 104 to sealingly couple housing 130 to intake port 112. Air valve insert 154 is positioned between air valve 131 and intake port 112 to keep a consistent inner diameter between air valve 131 and intake port 112. Optionally, for air valves with a larger or smaller inner diameter (not shown), a different size air valve insert may be used to keep a smooth transition between housing 130 and intake port 112. In yet another alternate embodiment, insert 154 is not needed where intake port 112 matches the size of air valve 131.

Another feature of motorcycle 2 includes an air deflector 50 (FIG. 4) which funnels air to rear cylinder 172 and thereby aids in cooling rear cylinder 172. Illustratively, air deflector 50 is integrally formed with housing portion 130 and additional details of air deflector 50 may be disclosed in U.S. Pat. No. 9,394,859, filed on Jul. 25, 2014, the complete disclosure of which is expressly incorporated by reference herein.

Referring to FIG. 6, air intake assembly 80 is coupled to intake port 112 using fasteners 184. Fasteners 184 pass through air valve 131, housing 130, seal 152, and intake port 112 to couple intake system 32 to engine 12. Housing 130 further includes a window 188 used to receive wires (not shown) for electronically controlling air valve 131. A seal (not shown) is used to sealingly couple the wires to housing 130.

Figure 7A:
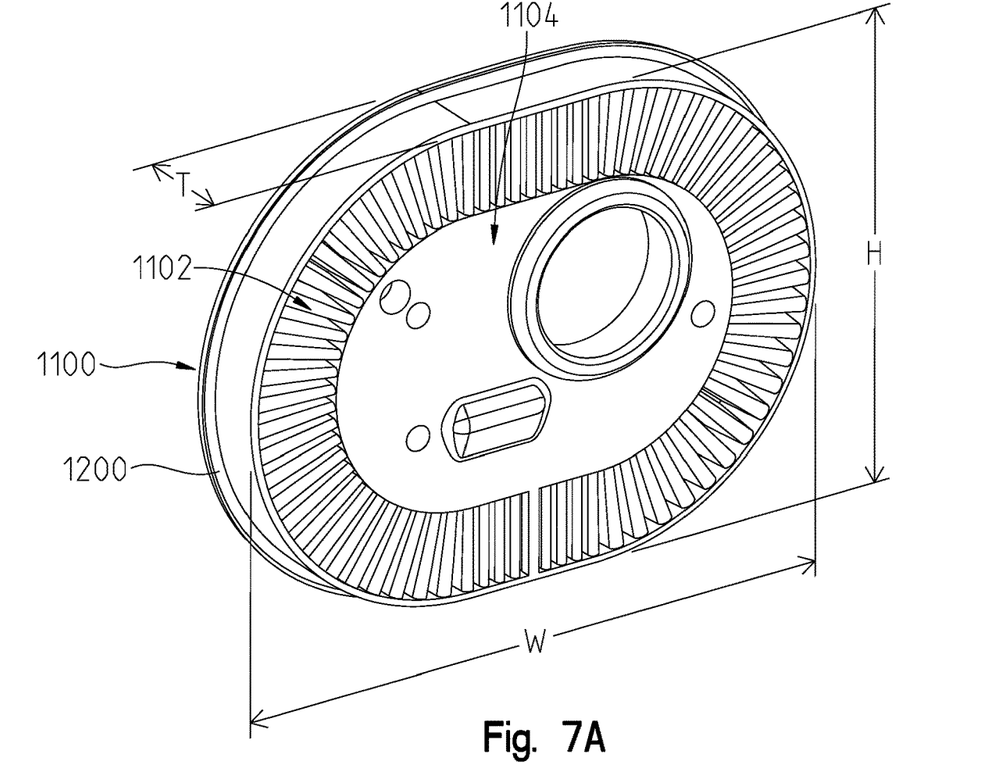
FIG. 7A is a front left perspective view of a filter of the air box of FIG. 4.
Figure 7B:
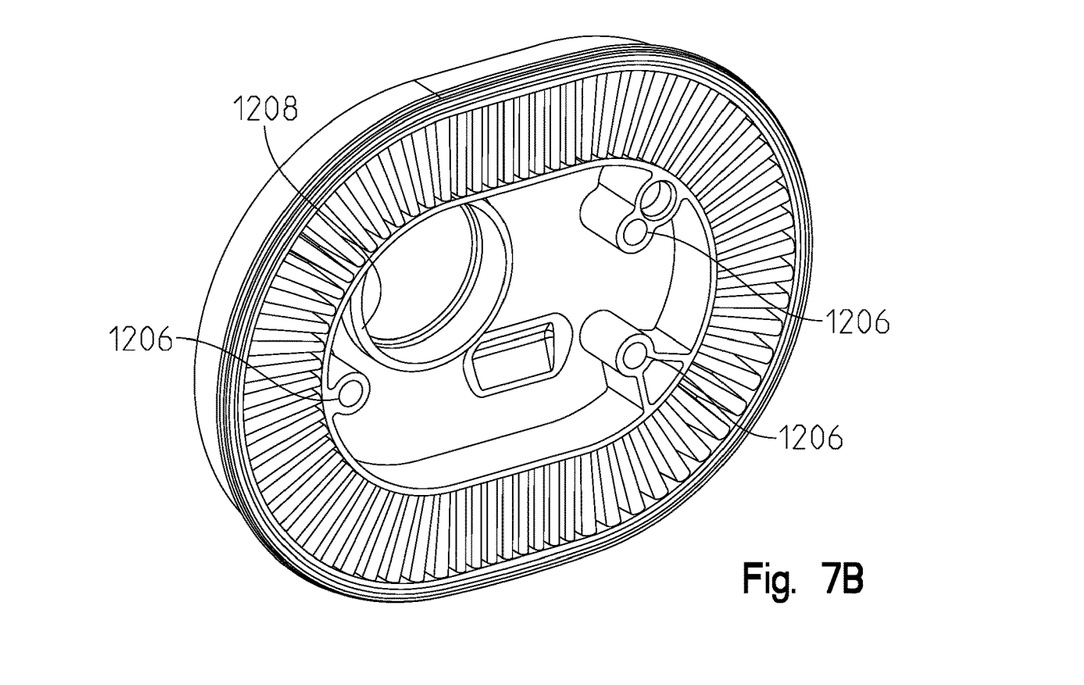
FIG. 7B is a rear right perspective view of the filter of FIG. 7A.

Referring to FIGS. 7A and 7B, details of filter 132 will be described. Filter 132, known as a flat panel filter having a substantially planar shape, is defined by a first dimension defining a width (W), a second dimension defining a height (H), and a third dimension defining a thickness (T) where dimensions W and H are larger than T. Filter dimension W generally extends along the longitudinal vehicle length, filter dimension H generally extends vertically and perpendicular to the longitudinal length of vehicle 2, and filter dimension T generally extends laterally along the vehicle and is generally perpendicular to both dimensions W and H. In one embodiment, dimension H is generally seven times greater than dimension T, dimension W is generally nine times greater than dimension T, and dimension W is generally 1.25 times greater than dimension H.

Figure 8:
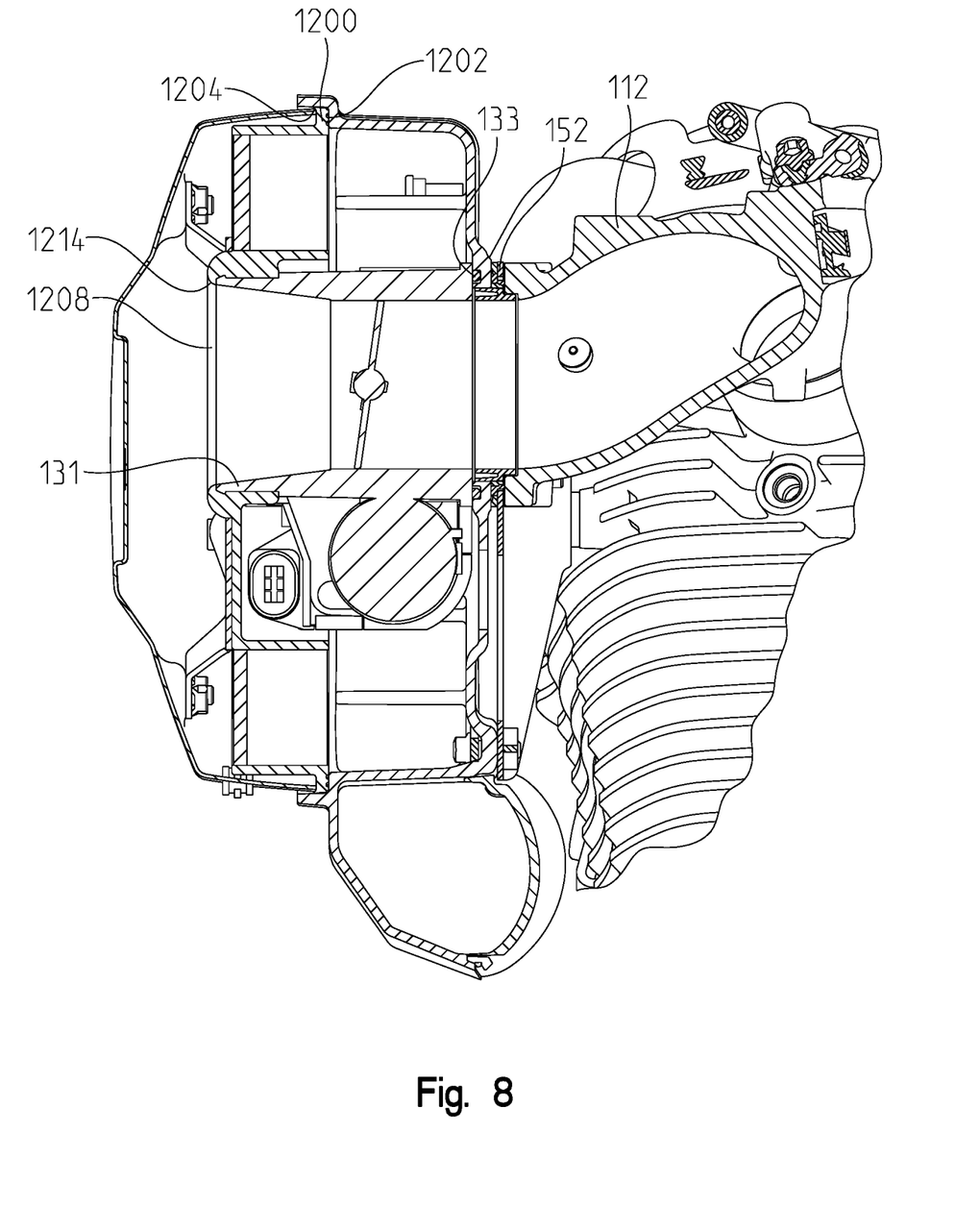
FIG. 8 is a cross-sectional view of the air box and engine of FIG. 3, taken along line 8-8 of FIG. 3.

Further, filter 132 has multiple integrated sealing surfaces, thereby eliminating the need for additional parts, as disclosed further herein. Filter 132 includes an outer portion 1100, a filter media 1102, and an inner portion 1104. Outer and inner portions 1100 and 1104 consist of a polymer material overmolded onto filter media 1102 that can deform to eliminate the need for additional sealing parts. In this way, filter 132 may be deformed to ensure filter 132 is sealed at all interfaces thereof without the need for additional seals or air-tight materials. Outer portion 1100 includes an arcuate lip 1200 which extends around the circumference of filter 132 and sealingly couples with a housing sealing surface 1202 and a cover sealing surface 1204 of housing 130, as shown in FIG. 8. Inner portion 1104 includes apertures 1206, 1208, and 1210. Apertures 1206 are sealingly coupled to cover mounts 174 (FIG. 4), aperture 1208 is sealingly coupled to air valve 131 (FIG. 8), and aperture 1210 is sealingly coupled to port 182 (FIG. 4) such that apertures 1206, 1208, 1210 ensure that housing 130 is sealed to various components of vehicle 2 and/or air intake system 32. Aperture 1208 is a central opening which is circumferentially surrounded by and located radially inward from filter media 1102 and outer portion 1100. Inner portion 1104 has an arcuate surface 1214 circumferentially surrounding aperture 1208 that reduces turbulent air entering air valve 131. In another embodiment, aperture 1208 is located radially inward from outer portion 1100 but not circumferentially surrounded by filter material 1102. By configuring filter 132 to seal at the outer perimeter of housing 130 and at all apertures and openings positioned therein, the configuration of housing 130 and filter 132 ensures that unfiltered air does not flow into engine 12. As disclosed further herein, all air within housing 130 first flows through filter media 1102 to remove debris and particulate matter, thereby providing only clean, filtered air to engine 12.

Figure 9:
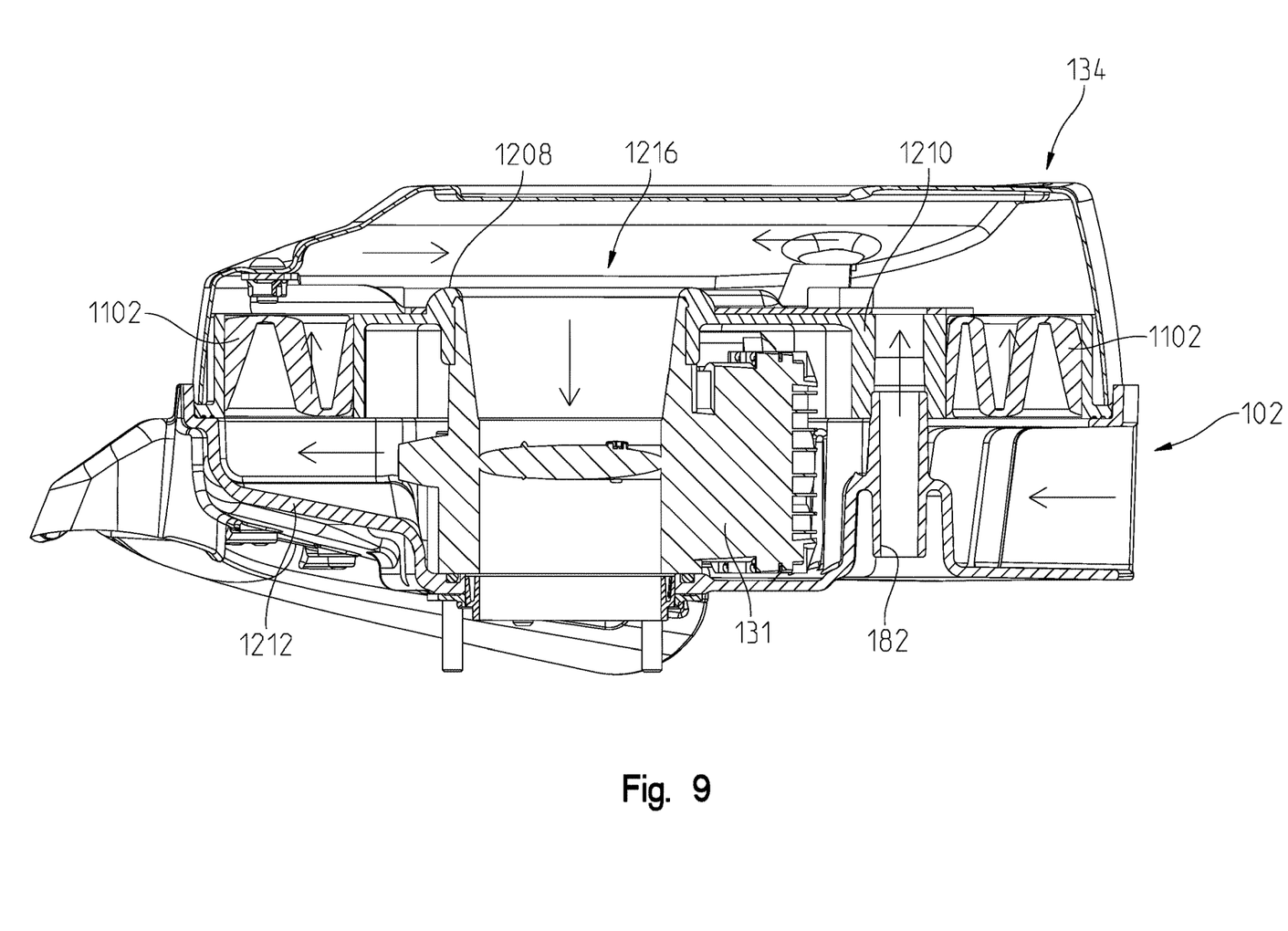
FIG. 9 is a cross-sectional view of the air box of FIG. 6, taken along line 9-9 of FIG. 7.

The airflow path of ambient air external to vehicle 2 to engine 12 is best shown in FIG. 9 and will be described herein. Intake ducts 102, when assembled, are forward facing such that forward movement of motorcycle 2 causes air to be received by intake ducts 102. After air enters intake ducts 102, it is received in housing 130 and travels through filter media 1102 in a direction generally perpendicular to the direction of travel along longitudinal centerline L. In other words, the air flows in a direction generally laterally outward from vehicle 2, as shown in FIG. 9. An additional feature of housing 130 is tapered surface 1212 which creates a smaller cross sectional area between housing 130 and filter media 1102 in a rearward direction. The smaller cross sectional area at a rear portion of housing 130 aids in directing airflow through the filter media 1102 and reducing turbulent air. After air passes through filter media 1102 to remove dust and debris, the air flows to a clean air volume 1216 located between filter 132 and cover 134. Ventilated crankcase gas is also received from port 182 and aperture 1210 in filter 132 and aperture 150 in plate 136 and flows into clean air volume 1216 as well. The air within clean air volume 1216 then passes through aperture 1208 of filter 134 in a direction generally parallel to the air passing through filter media 1102 (i.e., in a lateral direction generally perpendicular to longitudinal centerline L) and passes through air valve 131 before entering intake port 112 to flow into engine 12.

Figure 10:
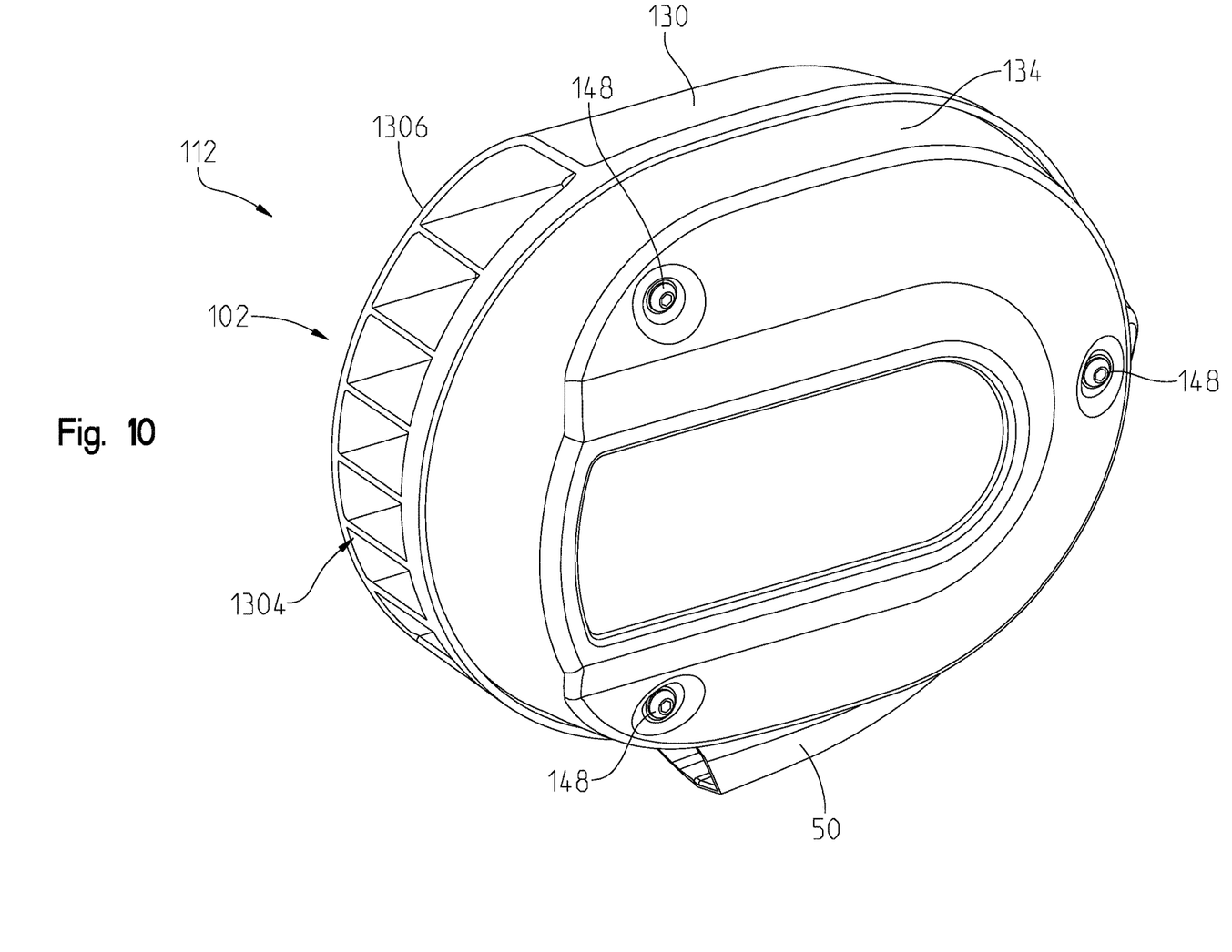
FIG. 10 is a front left perspective view of the air box of FIG. 1.
Figure 11:
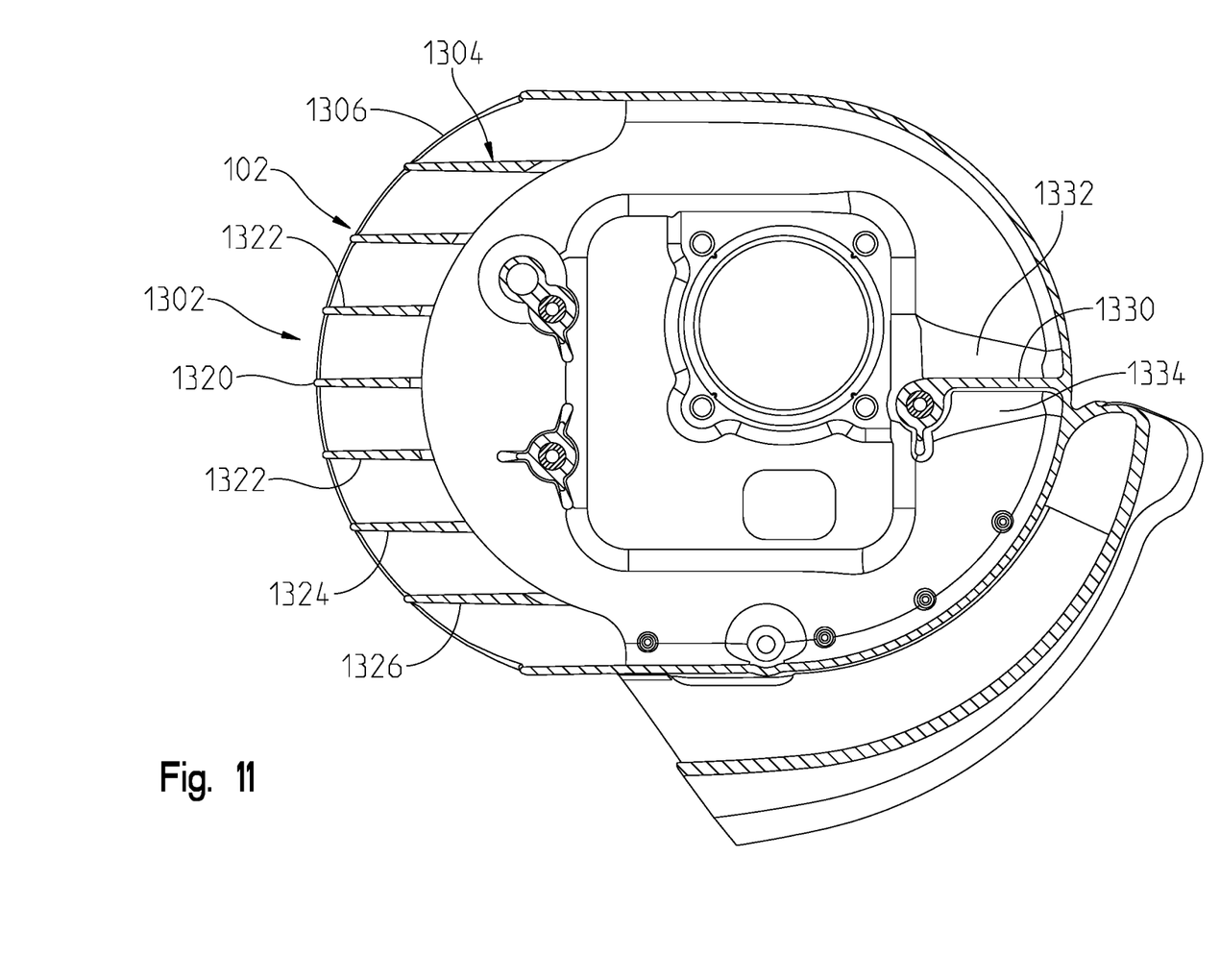
FIG. 11 is a cross-sectional view of the air box of FIG. 8.

Referring to FIGS. 10 and 11, intake port 112 defines the entrance of ambient air into filter assembly 80. Intake duct 102 includes at least one opening 1302 for providing air to housing 130. Illustratively, the at least one opening 1302 includes a plurality of openings 1302 which are located along a curvilinear or arcuate surface 1306 of housing 130 to maximize the entrance area of the filter assembly. Openings 1302 are separated or defined by a plurality of fins or walls 1304 positioned intermediate each opening 1302. More particularly, fins 1304 are generally parallel and spaced generally equidistant apart vertically inside housing 130 define openings 1302 and extend from the front curvilinear surface 1306 longitudinally rearward to various points within the housing and extend laterally from the housing towards filter 132. Fins 1304 divide air entering the intake duct 102 both vertically and longitudinally to distribute air more equally to different portions of housing 130.

Fins 1304 vary in length and include a center fin 1320 positioned at approximately the vertical midpoint of housing 130. Fins 1304 spaced further apart from center fin 1320 become progressively longer in the longitudinal direction with their respective spacing. For example, a fin 1322 positioned adjacent center fin 1320 is 0-10% longer than center fin 1320 and more particularly 4%, a fin 1324 positioned adjacent fin 1322 is 4-14% longer than fin 1322 and more particularly 9%, and a fin 1326 positioned adjacent fin 1324 is 23-32% longer than fin 1324 and more particularly 28%. In one example fin 1320 has an approximate length of 33-37 mm and more particularly 35 mm, fin 1322 has an approximate length of 35-38 mm and more particularly 37 mm, fin 1324 has an approximate length of 38-42 mm and more particularly 40 mm and fin 1326 has an approximate length of 48-54 mm and more particularly 51 mm. As shown in FIG. 11, center fin 1320 may have a forwardmost position or extent which is forward of the forwardmost positions of fins 1322, 1324, 1326. Additionally, the forwardmost positions of fins 1322, 1324, 1326 may be progressively rearward of the fin positioned vertically above such that the forwardmost position of fin 1322 is forward of the forwardmost position of fin 1324, which is forward of the forwardmost position of fin 1326. Similarly, a rearwardmost position or extent of each finds 1320, 1322, 1324, 1326 may vary such that a rearwardmost position of center fin 1320 is positioned forward of a rearwardmost position of fin 1322 which is positioned forward of a rearwardmost position of fin 1324. Additionally, a rearwardmost position of fin 1324 is positioned forward of a rearwardmost position of fin 1326.

In one embodiment, fins 1304 are all of equal length. In another embodiment, fins 1304 have different vertical spacing. In another embodiment, fins 1304 are angled relative to each other. In another embodiment, filter 132 has a substantially conical shape. In yet another embodiment, filter 132 has a substantially conical tapered shape.

Housing 130 further includes a divider or partition wall 1330 with ramped surfaces 1332 and 1334. Divider 1330 extends from the rear of housing 130 longitudinally forward towards air valve 131 and extends into housing 130 in a lateral direction towards filter 132. Divider 1330 prevents air entering an upper part of intake duct 102 above center fin 1320 from mixing with air entering a lower part of intake duct 102 below center fin 1320 because the mixed air could become turbulent. Rather, divider 1330, with aid of ramped surfaces 1332 and 1334, directs all air towards filter 132 and assists in minimizing turbulence in the air before flowing through filter 132.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A vehicle intake for a vehicle extending along a longitudinal centerline, comprising:
   an air filter housing having a housing inlet and a housing portion;
   a flat panel air filter having a filter inlet and a filter outlet; and
   an airflow path through the filter inlet is substantially parallel to an airflow path through the filter outlet;
   wherein the housing inlet is open to a direction of vehicle travel; and
   a distance between the housing portion and the flat panel air filter at a forward portion of the air filter housing is greater than a distance between the housing portion and the filter at a rearwardmost portion of the air filter housing.

2. The vehicle intake of claim 1, wherein an airflow path through the housing inlet is substantially perpendicular to the airflow path through the filter inlet.

3. The vehicle intake of claim 2, wherein the airflow path through the housing inlet is substantially parallel to a direction of vehicle travel.

4. The vehicle intake of claim 1, wherein the housing inlet is positioned at a first distance relative to the longitudinal centerline of the vehicle and the filter outlet is positioned at a second distance relative to the longitudinal centerline, and the first distance is less than the second distance.

5. The vehicle intake of claim 1, wherein the housing includes a clean air volume downstream of the filter and configured to receive filtered air from the filter, and the filter is positioned laterally intermediate the housing inlet and the clean air volume.

6. The vehicle intake of claim 1, wherein the housing includes a clean air volume downstream of the filter and configured to receive filtered air from the filter, and the filter is positioned laterally intermediate the longitudinal centerline and the clean air volume.

7. The vehicle intake of claim 1, wherein the filter housing further contains a cover.

8. The vehicle intake of claim 1, wherein the rearwardmost portion of the housing is positioned laterally outward of the forward portion of the housing.

9. The vehicle intake of claim 1, wherein the housing portion contains a partition wall at the rearward portion of the housing partitioning a portion of the housing into an upper section and a lower section.

10. The vehicle intake of claim 7, wherein the housing portion and the cover are removably coupled to each other, and removal of the cover exposes the filter.

11. The vehicle intake of claim 1, wherein the air filter contains an arcuate lip at the filter outlet.

12. The vehicle intake of claim 11, wherein the arcuate lip seals the filter at an interface of the housing.

13. The vehicle intake of claim 1, wherein the housing inlet is defined by an arcuate surface.

14. The vehicle intake of claim 1, wherein a projection of the filter on a vertical plane disposed longitudinally is greater than a projection of the filter on a vertical plane disposed laterally.

15. An air box configured to be fluidly coupled to an engine of a vehicle, the air box comprising:
a housing having a housing inlet; and
a filter positioned within the housing, the housing inlet contains a plurality of intake passages configured to direct air to different portions of the filter;
wherein the plurality of intake passages are forward facing when coupled to the vehicle.

16. The air box of claim 15, wherein the housing inlet contains a plurality of walls defining the intake passages.

17. The air box of claim 16, wherein the plurality of walls includes a first wall and a second wall and the second wall has a length greater than a length of the first wall.

18. The air box of claim 17, wherein the first wall has a forwardmost extent positioned forward of that of the second wall.

19. The air box of claim 17, wherein a first wall has a rearwardmost extent positioned forward of that of the second wall.

20. The air box of claim 19, wherein the first wall is located a first distance relative to a vertical midpoint of the air box and the second wall is located a second distance relative to the vertical midpoint, and the first distance is less than the second distance.

21. The air box of claim 17, wherein the filter is a flat panel filter.

22. The air box of claim 21, wherein the first wall intersects the filter when viewed from a side perspective view.

23. The air box of claim 15, wherein the housing contains a partition wall at a rear of the housing partitioning a portion of the housing into upper and lower sections.

24. An air box configured to be fluidly coupled to an engine of a vehicle, the air box comprising:
a housing; and
a filter positioned within the housing and having a filter media, a first portion defining an outer surface of the filter and a second portion defining an inner portion of the filter, and the filter media is positioned intermediate the first and second portions, and the second portion being positioned radially inward of the first portion, the second portion including an opening defining an outlet of the filter housing, the filter media is radially inward of the first portion;
wherein the first portion contains a first sealing surface and the second portion contains a second sealing surface and a third sealing surface.

25. The air box of claim 24, wherein the opening is in fluid communication with the engine of the vehicle and configured to provide filtered air to the engine.

26. The air box of claim 24, wherein the second portion is radially inward of the filter media.

27. The air box of claim 24, wherein the filter includes an air opening configured to receive filtered away from the filter media, and the air opening is longitudinally offset from a true center of the filter.

28. The air box of claim 24, wherein the second portion further contains a fourth sealing surface.

29. The air box of claim 24, wherein the first sealing surface seals the filter against the housing and the second sealing surface seals the filter against an air valve of the engine.

30. The air box of claim 28, wherein the third sealing surface seals the filter against a first portion of the housing and the fourth sealing surface seals the filter against a second portion of the housing.

31. An air box configured to be fluidly coupled to an engine of a vehicle, the air box comprising:
a flat-panel filter having a frame and a filter media positioned within the frame, and the frame includes an opening positioned radially inward of the frame and configured to provide filtered air to a throttle body of the engine;
wherein the filter frame contains an arcuate lip at the opening.

32. The air box of claim 31, wherein an air path through the filter media is substantially parallel to an opening of the throttle body.

33. The air box of claim 31, wherein the filter has a first dimension defining the filter height, a second dimension defining the filter width, and a third dimension defining the filter thickness, and the first and second dimension are larger than the third dimension.

34. The air box of claim 31, wherein the opening is positioned radially inward of at least a portion of the filter media.

35. The vehicle intake of claim 1, wherein an inner surface of the housing has tapered configuration extending from the forward portion to the rearwardmost portion.

36. The vehicle intake of claim 35, wherein the inner surface of the housing at the rearwardmost portion of the housing is positioned laterally outward of the inner surface of the housing at the forward portion of the housing.

37. The vehicle intake of claim 35, wherein the inner surface includes a recessed area at the rearwardmost portion of the housing.

\* \* \* \* \*